(12) United States Patent
Li et al.

(10) Patent No.: US 12,133,106 B2
(45) Date of Patent: Oct. 29, 2024

(54) SYSTEMS AND METHODS FOR ADAPTIVE COLLECTION OF QUALITY OF EXPERIENCE (QoE) MEASUREMENTS

(71) Applicant: ZTE Corporation, Guangdong (CN)

(72) Inventors: Dapeng Li, Guangdong (CN); Yin Gao, Guangdong (CN); Zhuang Liu, Guangdong (CN)

(73) Assignee: ZTE Corporation, Shenzhen (CN)

( * ) Notice: Subject to any disclaimer, the term of this patent is extended or adjusted under 35 U.S.C. 154(b) by 387 days.

(21) Appl. No.: 17/850,197

(22) Filed: Jun. 27, 2022

(65) Prior Publication Data

US 2022/0330071 A1 Oct. 13, 2022

Related U.S. Application Data

(63) Continuation of application No. PCT/CN2020/107945, filed on Aug. 7, 2020.

(51) Int. Cl.
*H04W 24/10* (2009.01)
*H04L 41/085* (2022.01)
(Continued)

(52) U.S. Cl.
CPC .......... *H04W 24/10* (2013.01); *H04L 41/085* (2013.01); *H04L 43/065* (2013.01); *H04L 43/0817* (2013.01); *H04W 28/0268* (2013.01)

(58) Field of Classification Search
CPC . H04W 24/10; H04W 28/0268; H04W 24/02; H04L 41/085; H04L 43/065; H04L 43/0817; Y02D 30/70
See application file for complete search history.

(56) References Cited

U.S. PATENT DOCUMENTS

2008/0189360 A1   8/2008 Kiley et al.
2009/0070417 A1   3/2009 Bao et al.
(Continued)

FOREIGN PATENT DOCUMENTS

JP   2015-111917 A   6/2015
JP   2016-036174 A   3/2016
(Continued)

OTHER PUBLICATIONS

3GPP TSG RAN Meeting #75 Revision No. RP-170786 Title New WI proposal: Quality of Experience (QoE) Measurement Collection for streaming services in E-UTRAN—2017 (Year: 2017).*
(Continued)

*Primary Examiner* — Nizar N Sivji
(74) *Attorney, Agent, or Firm* — Perkins Coie LLP (57) ABSTRACT

Methods, systems, and devices related to digital wireless communication, and more specifically, to techniques related to receiving, at a network node serving a wireless device via a communication network, a first list comprising device configuration parameters and a second list comprising base station configuration parameters, wherein at least one ID configuration parameter is included in both the first list and the second list; generating, by the network node, network-side usage measurement data based on testing the network node in accordance with the second list; receiving, from the wireless device, the device performance data of the wireless device based on local measurements at the wireless device in accordance with the first list; and receiving, at the network node, optimized settings from a remote server, wherein the optimized settings are based on the network-side usage measurement data collected from the network node and the device performance data collected from the wireless device.

20 Claims, 8 Drawing Sheets

(51) Int. Cl.
*H04L 43/065* (2022.01)
*H04L 43/0817* (2022.01)
*H04W 28/02* (2009.01)

(56) References Cited

U.S. PATENT DOCUMENTS

| | | | | |
|---|---|---|---|---|
| 2014/0295884 | A1* | 10/2014 | Racz | H04W 24/10 |
| | | | | 455/456.1 |
| 2015/0092579 | A1* | 4/2015 | Li | H04W 24/10 |
| | | | | 370/252 |
| 2018/0041913 | A1 | 2/2018 | Zhu et al. | |
| 2021/0029563 | A1* | 1/2021 | Hong | H04W 24/08 |
| 2022/0070709 | A1* | 3/2022 | Kumar | H04W 24/08 |
| 2022/0322154 | A1* | 10/2022 | Liu | H04W 28/06 |
| 2022/0330071 | A1* | 10/2022 | Li | H04L 43/0817 |

FOREIGN PATENT DOCUMENTS

| | | | | |
|---|---|---|---|---|
| WO | WO-2013180924 | A1 * | 12/2013 | H04L 5/0035 |
| WO | 2020164082 | A1 | 8/2020 | |

OTHER PUBLICATIONS

China Unicom et al., "New WI proposal: Quality of Experience (QoE) Measurement Collection for streaming services in E-UTRAN," 3GPP TSG-RAN Meeting #75, Dubrovnik, Croatia, RP-170786, 9 pages, Mar. 6-9, 2017.

Huawei, "Summary on [99#39][LTE/QMC] RAN controlled CP based solution," 3GPP TSG- RAN WG2 #99bis, Prague, Czech, R2-1710708, 8 pages, Oct. 9-13, 2017.

International Search Report and Written Opinion for International Application No. PCT/CN2020/107945, mailed on Apr. 29, 2021 (7 pages).

CATT, "Clarification of MDT Continuity," 3GPP TSG-RAN WG2 Meeting #106, R2-1905864, Reno, Nevada, USA, May 13-17, 2019 (6 pages).

ZTE, "NR user consent and Multiple PLMN," 3GPP TSG-RAN WG3 #105bis, R3-195743, Chongqing, China, Oct. 14-18, 2019 (6 pages).

Office Action for Japanese Patent Application No. 2022-539670, mailed Jun. 21, 2023, with English summary (21 pages).

ZTE, "On QoE Measurement Collection," 3GPP TSG-RAN WG3 #108-e, E-Meeting, R3-203868, 10 pages, Jun. 1-11, 2020.

Huawei et al., "Discussion on QoE measurement collection for RDC," 3GPP TSG-RAN WG2 Meeting #105, Athens, Greece, R2-1901857, 3 pages, Feb. 25-Mar. 1, 2019.

Ericsson, "Change Request: CR TS 36.423 on QoE measurement collection support for X2AP," 3GPP TSG-RAN3 Meeting #108-e, E-Meeting, R3-204118, Jun. 1-12, 2020.

Extended European Search Report for European Patent Application No. 20948791.7, mailed Nov. 7, 2022 (16 pages).

* cited by examiner

SYSTEMS AND METHODS FOR ADAPTIVE COLLECTION OF QUALITY OF EXPERIENCE (QoE) MEASUREMENTS

CROSS REFERENCE TO RELATED APPLICATIONS

This patent document is a continuation of and claims benefit of priority to International Patent Application No. PCT/CN2020/107945, filed on Aug. 7, 2020. The entire content of the before-mentioned patent application is incorporated by reference as part of the disclosure of this application.

TECHNICAL FIELD

This patent document is directed generally to wireless communications.

BACKGROUND

The rapid development of mobile communication has penetrated into all aspects of people's work, social life, and life, and has brought a huge impact on people's lifestyle, work style, social politics, economy and other aspects. Human society has entered the information age, and business application requirements in all aspects are showing explosive growth. In the future, mobile networks will not only provide communication between people, but also provide services for mass devices of the Internet of Things. For example, virtual reality, high-definition video, and other services that require ultra-high-speed services, the rate can reach 10 to 100 times the current rate; such as the Internet of Vehicles and other services that require low-latency services, the end-to-end delay can be reduced by 5 times; Networking can access 1,000 times the current number of services, and the battery life can also be extended to 10 times the current.

QOE (Quality of User Experience) measurement collection is a technology which defined in 3GPP. This allows a network to collect application layer measurements from the UE. For LTE networks, the supported service types are QoE measurement collection for streaming services and QoE measurement collection for MTSI services. Application layer measurement configuration received from Operations, Administration, and Maintenance (OAM) or Core Network is encapsulated in a transparent container, which is forwarded to the UE in a downlink message. Application layer measurements received from a UE's higher layer are encapsulated in a transparent container and sent to the network in an uplink message. More information can be found in TS38.300 section 23.16 of the 3GPP protocol specification. However, the application layer of the UE is limited to only QoE measurements and cannot measure the performance of services on the network side.

SUMMARY

This document discloses methods, systems, and devices related to digital wireless communication, and more specifically, to techniques related to reselecting a network in a network sharing split architecture.

In one exemplary aspect, a method for wireless communication includes receiving, at a network node serving a wireless device via a communication network, a first list comprising device configuration parameters and a second list comprising base station configuration parameters, wherein at least one ID configuration parameter is included in both the first list and the second list; generating, by the network node, network-side usage measurement data based on testing the network node in accordance with the second list; receiving, from the wireless device, the device performance data of the wireless device based on local measurements at the wireless device in accordance with the first list; and receiving, at the network node, optimized settings from a remote server, wherein the optimized settings are based on the network-side usage measurement data collected from the network node and the device performance data collected from the wireless device.

In another exemplary aspect, a method for wireless communication includes receiving, at a network node serving a wireless device in a communication network, authorization information from a central node indicating a consent for requesting user-sensitive information associated with the wireless device; sending, to the wireless device, a request for the user-sensitive information; and receiving, from the wireless device, a response to the request for the user-sensitive information.

In another exemplary aspect, a wireless communications apparatus comprising a processor is disclosed. The processor is configured to implement a method described herein.

In yet another exemplary aspect, the various techniques described herein may be embodied as processor-executable code stored on a computer-readable program medium.

The details of one or more implementations are set forth in the accompanying attachments, the drawings, and the description below. Other features will be apparent from the description and drawings, and from the claims.

DETAILED DESCRIPTION

Section headings are used in the present document only for ease of understanding and do not limit scope of the embodiments to the section in which they are described. Furthermore, while embodiments are described with reference to 5G examples, the disclosed techniques may be applied to wireless systems that use protocols other than 5G or 3GPP protocols.

The development of the new generation of wireless communication—5G New Radio (NR) communication—is a part of a continuous mobile broadband evolution process to meet the requirements of increasing network demand. NR will provide greater throughput to allow more users connected at the same time. Other aspects, such as energy consumption, device cost, spectral efficiency, and latency are also important to meeting the needs of various communication scenarios.

Overview

The structure may of a 5G wireless network can include a 5G core network (5GC or 5G core) and a 5G access network. The 5G core network may include network elements relating to an access and mobility management unit (AMF), a user plane function (UPF), and a 5G access network that may include a network element 5G enhanced eNB base station (ng-eNB) or a 5G base station (gNB). The interface between the network element of the core network and the network element of the access network may include an NG interface, and the interface between the network elements of the access network may include an Xn interface. A RAN node can be a gNB (5G base station) providing New Radio (NR) user plane and control plane services. As another example, a RAN node can be an enhanced 4G eNodeB that connects to the 5G Core network via the NG interfaces but still uses 4G LTE air interface(s) to communicate with the 5G UE/wireless device.

In 5G networks, many types of services have been introduced for enhanced user experience. While services such as Ultra-reliable low-latency communication (URLLC) provide a rich service experience, they also place higher requirements on wireless mobile networks. However, it is difficult to make a comprehensive assessment of the user experience (QOE) solely based on the UE measurements. For example, during service use, if the base station to which the UE is connected is of a split-architecture (e.g., gNB-CU-CP, gNB-DU, gNB-CU-UP), then service transmission delay may increase because of data transmissions between gNB-DU and gNB-CU-UP. As another example, during service use, if the air interface to which the UE is connected is interfered, the packet loss of the service of UE's service may increase. Thus, the Quality of Experience (QOE) measurements from the perspective of the User Equipment (UE) have a relationship to network-side parameters. However, according to current technology, QoE measurement of the UE is a function provided by the application layer software on the UE, and these functions cannot measure the usage of the network side service. For example, the UE may not be aware of packet loss, delay, or other network side parameters. Because of the lack of measurements on the network-side usage, the QoE of the UE cannot be further improved by optimizing the network configuration.

In addition, the QoE measurement trigger of the UE and the acquisition of the measurements have associated security risks. In conventional designs, the base station obtains the QoE measurements of the UE without the authorization of the UE, which poses security risks. Thus, there is a need to address the afore-mentioned problems.

Example Embodiments

QOE (Quality of User Experience) measurement collection is a technology which defined in 3GPP. This allows a network to collect application layer measurements from the UE. For LTE networks, the supported service types are QoE measurement collection for streaming services and QoE measurement collection for MTSI services. Application layer measurement configuration received from Operations, Administration, and Maintenance (OAM) or Core Network is encapsulated in a transparent container, which is forwarded to the UE in a downlink message. Application layer measurements received from a UE's higher layer are encapsulated in a transparent container and sent to the network in an uplink message. More information can be found in TS38.300 section 23.16 of the 3GPP protocol specification. However, the application layer of the UE is limited to only QoE measurements and cannot measure the performance of services on the network side.

For measuring network-side performance (such as the time delay of data packets on the network side, and the throughput rate of data packets), in some embodiments, Minimized Drive Test (MDT) technology can be used. More information can be obtained in TS 37.320 of the 3GPP protocol specification.

Example Embodiment 1

Embodiments disclosed herein are directed at associating with the QoE measurements of the UE side application layer and MDT measurements at the RAN node for generating optimized network configuration. By collecting QoE measurements from the UE, and MDT measurements from the RAN node, a thorough analysis can be performed. The analysis can be used for generating optimized settings which can improve overall performance of the entire network. In some embodiments, an analysis server can receive QoE measurements and MDT measurements to identify potential problems. The server can analyze how to further improve the service quality of an individual UE. For example, the server analyzes whether the UE's service quality can be improved by adjusting network resources/network parameters, or adjusting parameters configured on the UE side.

Figure 1:
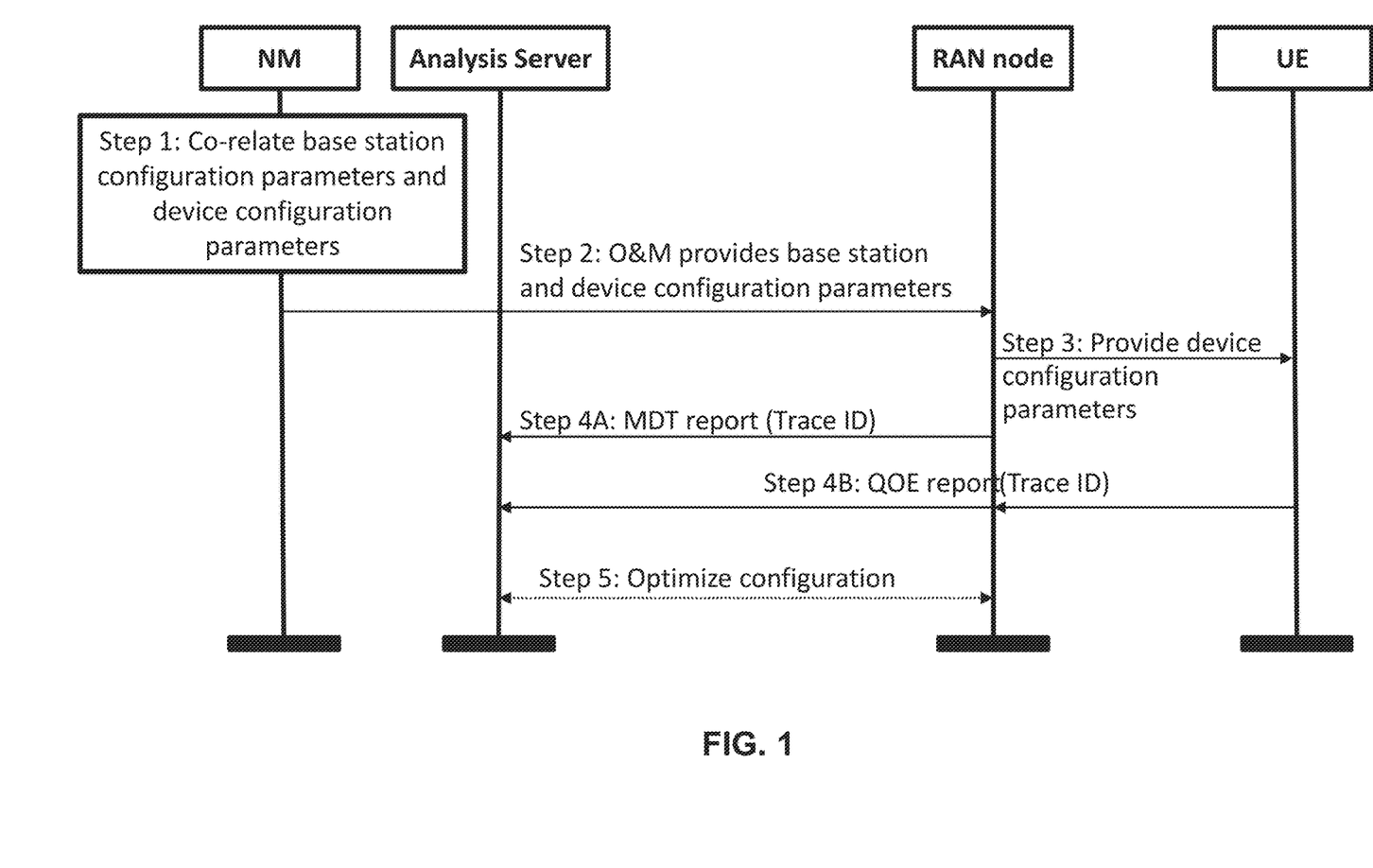
FIG. 1 is a high-level signaling process associated with generating optimized network settings based on collecting Minimized Test Drive (MDT) measurements and Quality of Experience (QoE) measurements, in accordance with an example embodiment.

FIG. 1 is a high-level signaling process associated with generating optimized network settings based on collecting Minimized Test Drive (MDT) measurements and Quality of Experience (QoE) measurements. The MDT measurements are made by a RAN node (alternatively, a base station) and the QoE measurements are made by a UE (alternatively, a wireless device). The QoE measurements and MDT measurements are triggered based on device configuration parameters and base station configuration parameters sent to the UE and the RAN node respectively. Upon receiving the base station configuration parameters, a RAN node performs MDT measurements. Examples of base station configuration parameters include Trace ID, MDT measurement interval, and MDT sampling period. Upon receiving the device configuration parameters, a UE (typically, the application layer) performs QoE measurements. Examples of device configuration parameters include Trace ID, QoE measurement interval, a service type corresponding to the measurement, packet loss, and packet delay.

Step 1: The network manager (NM) correlates device configuration parameters and base station configuration parameters. Correlating device configuration parameters and base station configuration parameters can include determining that the MDT measurements and QOE measurements are consistent or inter-related. For example, when a UE measures user message delay, a base station should also measure message delay. As another example, the QoE measurement of certain services can be closely related to the performance of communication components such as clock synchronicity.

Accordingly, the NM can ensure that clock synchronicity is added as a configuration parameter to be measured in MDT. In some embodiments, the measurement intervals of MDT measurements and QoE measurements are related. For example, the measurement interval of MDT measurements and QoE measurements can be the same, or they can be related by a multiplication factor. In some embodiments, the sampling periods of MDT measurements and QoE measurements are related. For example, the sampling period of MDT measurements and QoE measurements can be the same, or they can be related by a multiplication factor. For example, the NM can ensure that the sampling period of QoE measurements is 100 milliseconds, and the sampling period of MDT measurements is 50 milliseconds. Accordingly, two MDT measurements and one QOE measurement can be considered for analysis.

In some embodiments, the NM can include multiple device configuration parameters in a first list and multiple base station configuration parameters in a second list. In some embodiments, both the first list and the second list can include transaction identifiers as a configuration parameter). The identifiers can be unique across the entire communication network (e.g., a public land mobile network or PLMN). Examples of unique identifiers can include MDT session ID, MDT Trace ID, Quad Integrated Communications Controller Multichannel Controller (QMC) ID, QoE session ID, or QoE Trace ID. By including the unique identifiers in both lists, the QoE measurements from the UE and MDT measurements from the RAN can be cross-referenced with one another for purposes of analysis.

Step 2: The network manager sends the base station configuration parameters and the device configuration parameters to the base station.

Step 3: The base station sends the device configuration parameters to the UE. The base station performs MDT measurements in accordance with the base station configuration parameters. In some embodiments, the base station adds the unique identifier to the device configuration parameters before sending the device configuration parameters to the UE.

Step 4A, 4B: The base station sends the MDT measurements to an analysis server (Step 4A). The UE sends the QoE measurements (alternatively, the device measurement data collected by the UE) to the analysis server, e.g., via the base station (Step 4B). Unique transaction identifiers are commonly included as a QoE measurement and as a MDT measurement for cross-referencing purposes. In some implementations, the base station can use the unique transaction identifier (e.g., as an index commonly included in two data sets) to merge the device measurement data and the base station measurement data into a combined dataset, which is then sent to the analysis server for further computations.

Step 5: The analysis server generates optimized configuration settings based on the QoE measurements and MDT measurements.

Although the example herein illustrates a first list of device configuration parameters and a second list of base station parameters, in alternate implementations, the first list and the second list can have multiple items in common. That is, the NM can send one or more base station configuration parameters in the first list and/or device configuration parameters in the second list.

In some implementations, the base station can use the unique transaction identifier to merge the device measurement data (collected from the UE) and the base station measurement data into a combined dataset, which is then sent to the analysis server for further computations.

Example Embodiment 2

Figure 2:
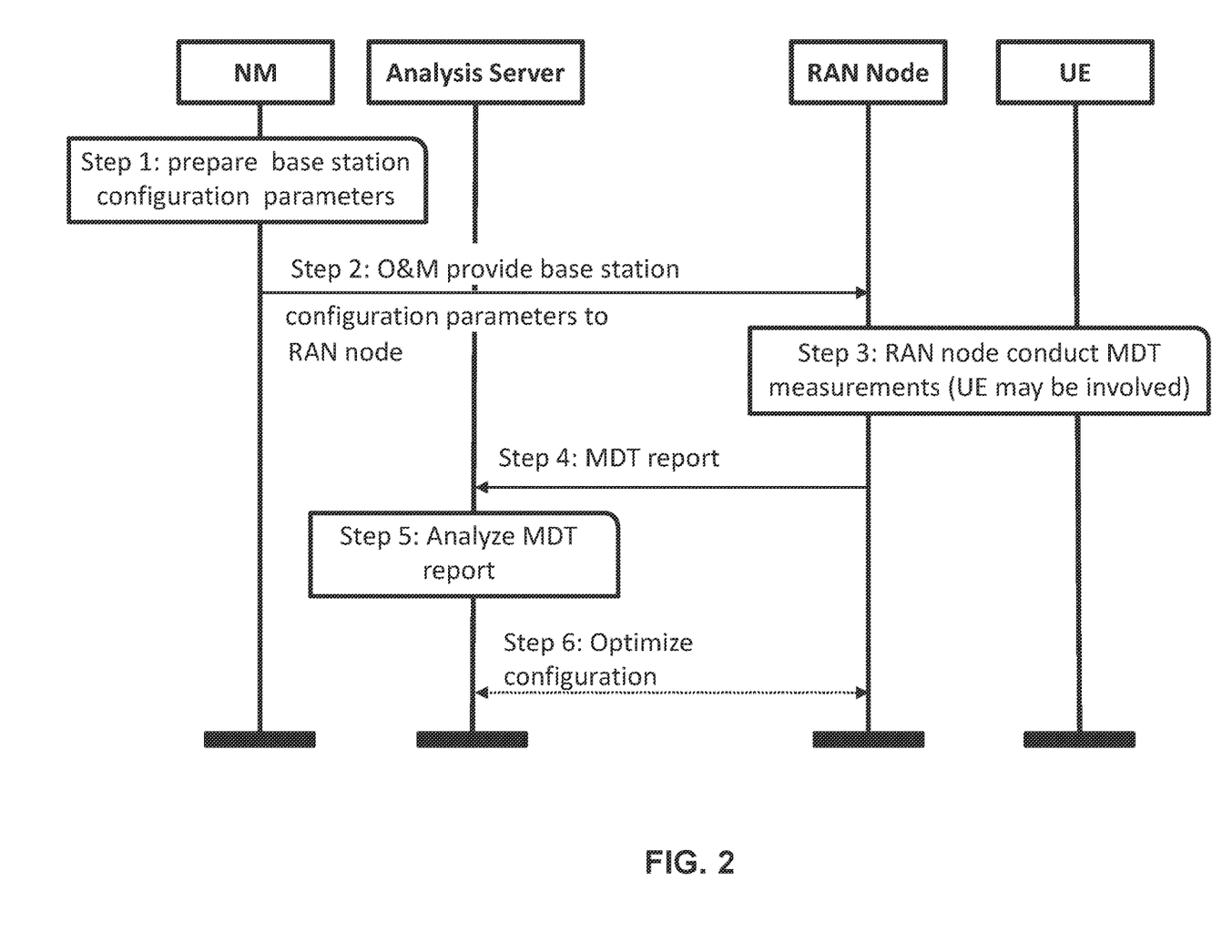
FIG. 2 is a signaling process for collecting Minimized Test Drive (MDT) measurements, in accordance with an example embodiment.

FIG. 2 is a signaling process for collecting Minimized Test Drive (MDT) information.

Step 1: The Network Manager (NM) prepares base station configuration parameters. For example, this is similar to Step 1 discussed in embodiment 1. In some embodiments, base station configuration parameters (alternatively, MDT configuration parameters) can include one or more of: MDT session ID, MDT Trace ID, delay, packet loss, throughput, network signal reception strength, UE ID, UE selection criteria, MDT measurement interval, MDT measurement period, user consent for MDT measurements, and an IP address of the computing server.

Step 2: The NM sends base station configuration parameters to a RAN node. In some implementations, the NM can send the base station configuration parameters to the RAN node through the Core network. This method is called signaling-based MDT. In some implementations, the NM can send the base station configuration parameters directly to the RAN node. This method is called management-based MDT.

Step 3: The RAN node performs MDT measurements. The RAN node measures the performance of the network side according to the parameters in the configuration, such as network delay, network packet loss rate, network throughput rate, and network signal reception strength. In some implementations, these measurements can be combined into an MDT report.

Step 4: The RAN node sends the MDT measurements to the analysis server. The IP address of the analysis server can be included in the base station configuration parameters sent to the RAN node in Step 2. In some implementation, the RAN node includes the IP address of the analysis server in the MDT report. This also facilitates grouping of MDT reports according to the server. For example, if MDT Report A includes a server address 1, MDT Report B include server address 2, and MDT Report C includes a server address 3, then MDT Report A and MDT Report C are sent to server 1 for analysis, and MDT Report B is sent to server 2 for analysis.

Step 5: The analysis server analyzes the MDT measurements.

Step 6: The analysis server can generate optimized network settings (according to the MDT measurements by the RAN node and/or the QoE measurements by a UE) for adjusting network parameters. Examples of optimized network settings can include buffer size, bearer priority level, and 5G Quality of Service information. The analysis server can determine normal/bad/good performance of service to the UE by the RAN node serving the mobile device, based on comparing data throughput, packet jitter, and other measurements with pre-determined thresholds. Further, the analysis server can use Reference Signal Receive Power (RSRP) measurement data of the UE and a pre-configured network deployment map of the base station to identify coverage holes and/or service hot spots in the wireless network.

Although the example herein illustrates the NM sending base station configuration parameters to a RAN node, in alternate embodiments, the NM can also additionally send device configuration parameters to a RAN node.

Example Embodiment 3

Figure 3:
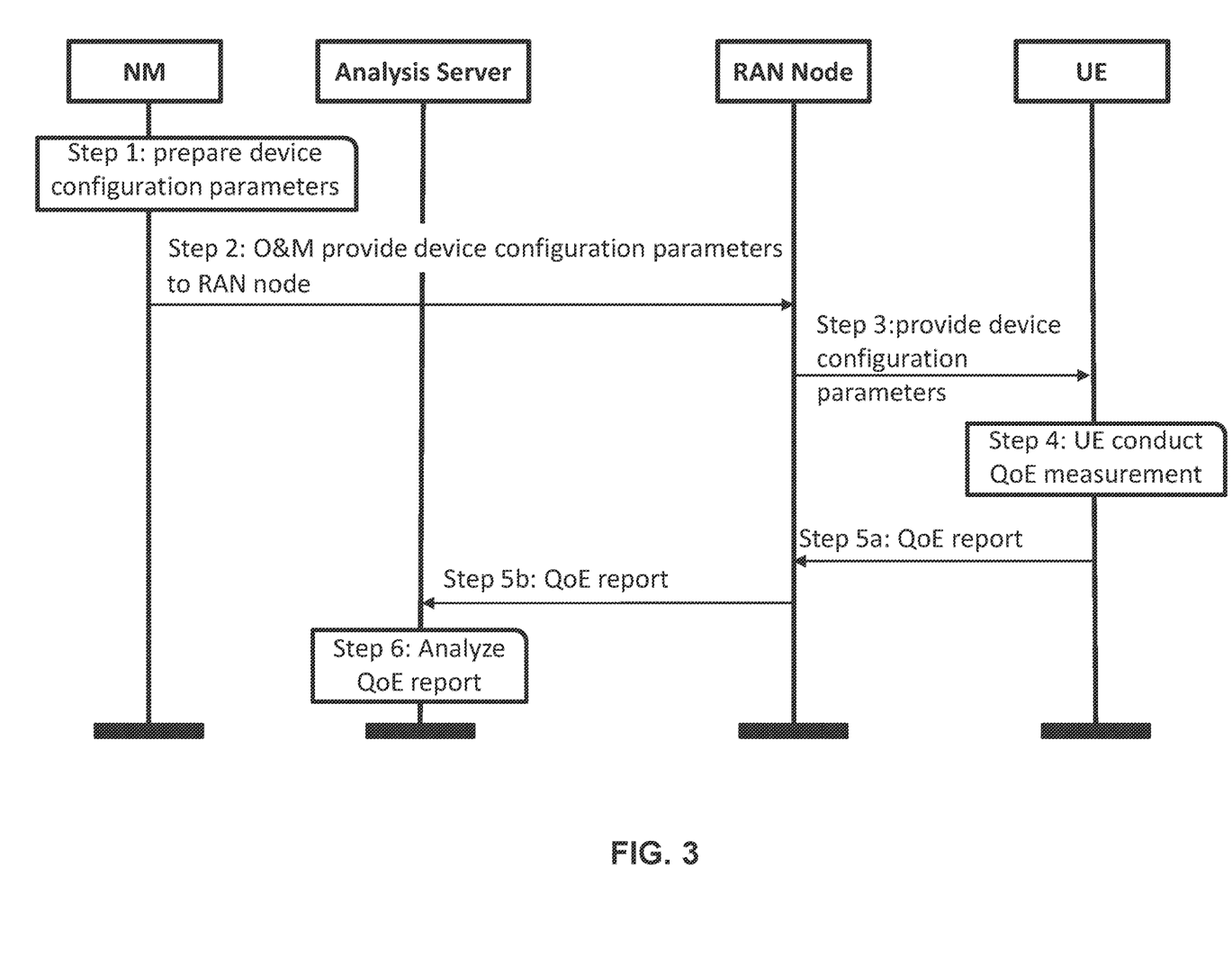
FIG. 3 is a signaling process for collecting Quality of Experience (QoE) measurements, in accordance with an example embodiment.

FIG. 3 is a signaling process for collecting Quality of Experience (QoE) information/measurements from the UE.

Step 1: The Network Manager (NM) prepares device configuration parameters. For example, this is similar to Step 1 discussed in embodiment 1. In some embodiments, device configuration parameters (alternatively, QoE configuration parameters) can include one or more of: QoE Session ID/QMC ID/Trace ID, an IP address of the computing server, QoE measurement interval, QoE measurement period, user consent for QoE measurement, and QoE measurement metrics. Examples of QoE measurement metrics include a type of service associated with the wireless device, packet delay, packet loss, packet drop, throughput associated with the wireless device, Internet Protocol (IP) latency, network slice information, and clock synchronicity. Examples of service type include streaming service, Multimedia Telephony Service over IMS (MTSI), Over-the-Top (OTT) voice service, AR/VR video service, and Real-time gaming service. More information can be obtained from 3GPP specification TS 28.552.

Step 2: The NM sends device configuration parameters to a RAN node. In some implementations, the NM can send the base station configuration parameters to the RAN node through the Core network. This method is called signaling-based MDT. In some implementations, the NM can send the base station configuration parameters directly to the RAN node. This method is called management-based MDT.

Step 3: The RAN node sends the device configuration parameters to the UE.

Step 4: The UE performs QoE measurements. For example, the UE measures the performance (from the UE side) according to the device configuration parameters, whether the streaming service is continuous, and the jitter conditions. In some implementations, these measurements can be combined into a QoE report.

Step 5a: The UE sends the QoE measurements to RAN node. In some implementations, because of mobility, the UE can move to a new base station and report the QoE measurements. Thus, the RAN node that receives the QoE measurements from the UE may be different from the RAN node that sent the device configuration parameters to the UE in step 3.

Step 5b: The RAN node sends the QoE measurements to the analysis server. The IP address of the analysis server can be included in the device configuration parameters sent to the UE in Step 3. In some implementation, the UE includes the IP address of the analysis server in the QoE report.

Step 6: The analysis server analyzes the report for generating optimized network settings applicable to the base station and/or the UE. In some implementations, the analysis server can be a physical server. In some implementations, the analysis server can be a cloud server. The analysis server can include artificial intelligence (AI) and machine learning (ML) functionalities.

Example Embodiment 4

Figure 4:
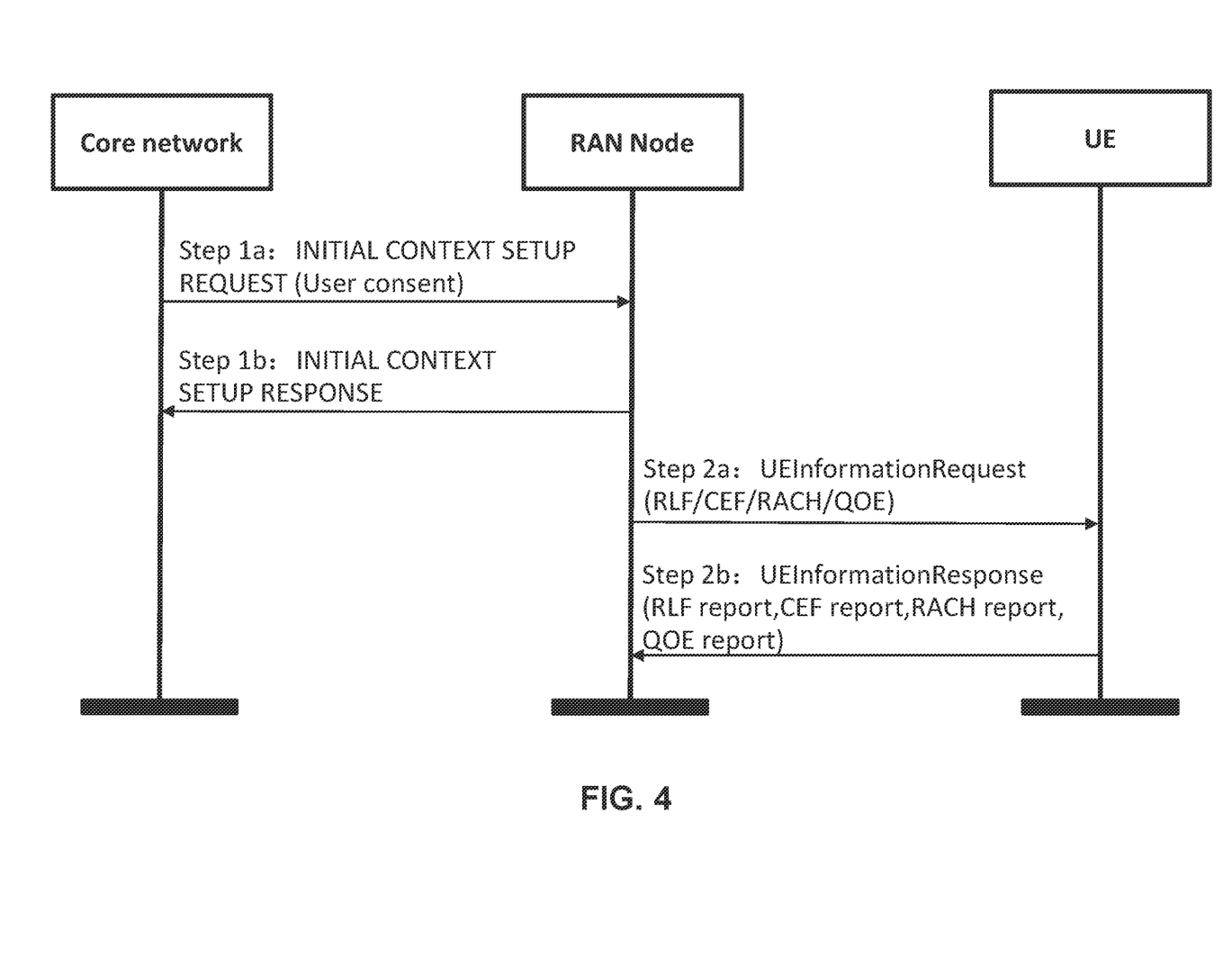
FIG. 4 is a signaling process associated with authorization to obtain QoE measurements, in accordance with an example embodiment.

FIG. 4 is a signaling process associated with authorization to obtain QoE measurements, in accordance with an example embodiment. In some embodiments, QoE measurements can be user-sensitive. Such user-sensitive QoE measurements may not be permitted without the user's permission. Thus, the base station can receive a consent for the user-sensitive QoE measurements from the core network (central node).

Step 1a: The core network sends the user consent information of the UE to the base station. The user consent can be expressed as one or more PLMNs, e.g., in a list of PLMNs. For a PLMN included in the list from the core network, the base station is allowed to receive QoE measurements, or otherwise receive reports of measurements with user-sensitive information, from the UE. The user consent can be a PLMN list. Indicates that in the case of the PLMN in the list, the base station can obtain the RLF report, RACH report, CEF report, and QOE report of the UE. As shown in FIG. 4, the core network can use the INITIAL CONTEXT SETUP REQUEST message to send the user consent to the base station.

Step 1b: The base station can respond with an INITIAL CONTEXT SETUP RESPONSE message to the core network.

Step 2a: The base station can request a request for the user-sensitive information to the UE. The request can include requests of RLF, RACH, CEF and/or QoE measurements.

Step 2b: The UE sends a response to the request for the user-sensitive information. For example, the UE can send the report(s) requested by the base station through the UEInformationResponse message of RRC. For example, the reports can include one or more of: a radio link failure (RLF) report, a random access channel (RACH) report, a cloud edge fabric (CEF) report, or a QOE report of the UE. For example, the RRC UEInformationRequest message from the base station to the UE can be used to include requests of RLF, RACH, CEF and/or QOE reports.

Example Embodiment 5

In some embodiments, due to the movement of the terminal, the UE switches from one base station to another base station. As a result, the base station configuration parameters and/or the device configuration parameters can be sent by the NM to other base station(s) through the inter-base station interface. For example, in the case of the XN interface, the HANDOVER REQUEST message can be used to transfer configuration parameters.

Example Embodiment 6

In some embodiments, a base station can support a split architecture, e.g., comprising a gNB-DU node and a gNB-CU-UP node. In those embodiments, the device configuration parameters and the base station configuration parameters are received at the gNB-DU node via F1AP and at the gNB-CU-UP node via E1AP. Additional details of the F1AP and E1AP processes can be obtained from 3GPP protocols TS38.473 and TS 38.463, respectively.

Example System Implementations

Figure 5:
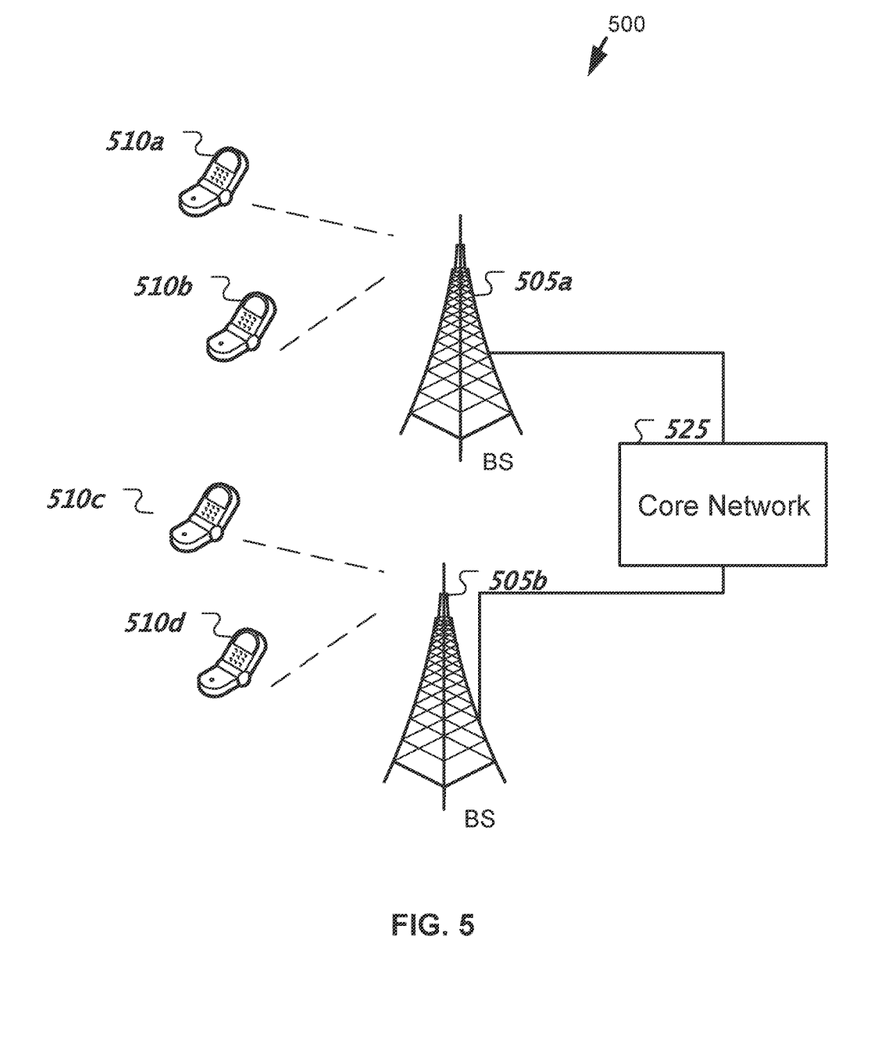
FIG. 5 shows an example of a wireless communication system where techniques in accordance with one or more embodiments of the present technology can be applied.

FIG. 5 shows an example of a wireless communication system where techniques in accordance with one or more embodiments of the present technology can be applied. A wireless communication system 500 can include one or more base stations (BSs) 505a, 505b, one or more wireless devices 510a, 510b, 510c, 510d, and a core network 525. A base station 505a, 505b can provide wireless service to wireless devices 510a, 510b, 510c and 510d in one or more wireless sectors. In some implementations, a base station 505a, 505b includes directional antennas to produce two or more directional beams to provide wireless coverage in different sectors.

The core network 525 can communicate with one or more base stations 505a, 505b. The core network 525 provides connectivity with other wireless communication systems and wired communication systems. The core network may include one or more service subscription databases to store information related to the subscribed wireless devices 510a, 510b, 510c, and 510d. A first base station 505a can provide wireless service based on a first radio access technology, whereas a second base station 505b can provide wireless service based on a second radio access technology. The base stations 505a and 505b may be co-located or may be separately installed in the field according to the deployment scenario. The wireless devices 510a, 510b, 510c, and 510d can support multiple different radio access technologies. In some embodiments, the base stations 505a, 505b may be configured to implement some techniques described in the present document. The wireless devices 510a to 510d may be configured to implement some techniques described in the present document.

In some implementations, a wireless communication system can include multiple networks using different wireless technologies. A dual-mode or multi-mode wireless device includes two or more wireless technologies that could be used to connect to different wireless networks.

Figure 6:
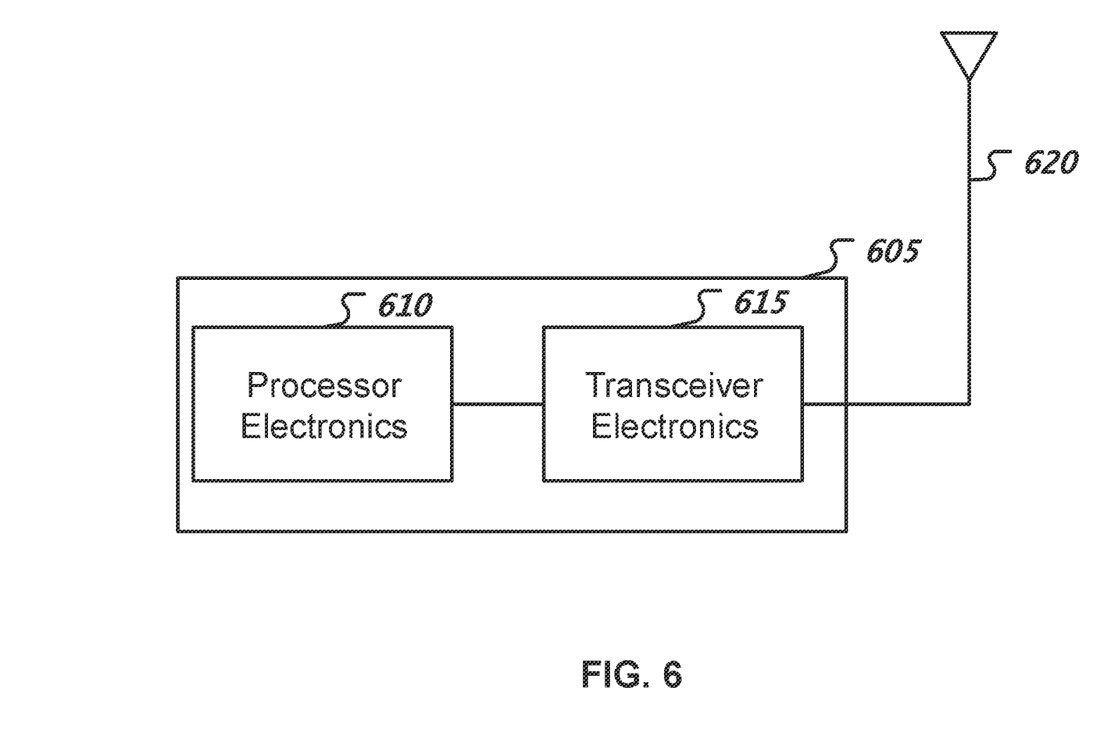
FIG. 6 is a block diagram representation of a portion of a hardware platform.

FIG. 6 is a block diagram representation of a portion of a hardware platform. A hardware platform 605 such as a network node or a base station or a wireless device (or UE) can include processor electronics 610 such as a micropro- cessor that implements one or more of the techniques presented in this document. The hardware platform 605 can include transceiver electronics 615 to send and/or receive wired or wireless signals over one or more communication interfaces such as antenna 620 or a wireline interface. The hardware platform 605 can implement other communication interfaces with defined protocols for transmitting and receiv- ing data. The hardware platform 605 can include one or more memories (not explicitly shown) configured to store information such as data and/or instructions. In some imple- mentations, the processor electronics 610 can include at least a portion of the transceiver electronics 615. In some embodiments, at least some of the disclosed techniques, modules or functions, a central node, a distributed node, a terminal or network nodes are implemented using the hard- ware platform 605.

From the foregoing, it will be appreciated that specific embodiments of the presently disclosed technology have been described herein for purposes of illustration, but that various modifications may be made without deviating from the scope of the invention. Accordingly, the presently dis- closed technology is not limited except as by the appended claims.

Figure 7:
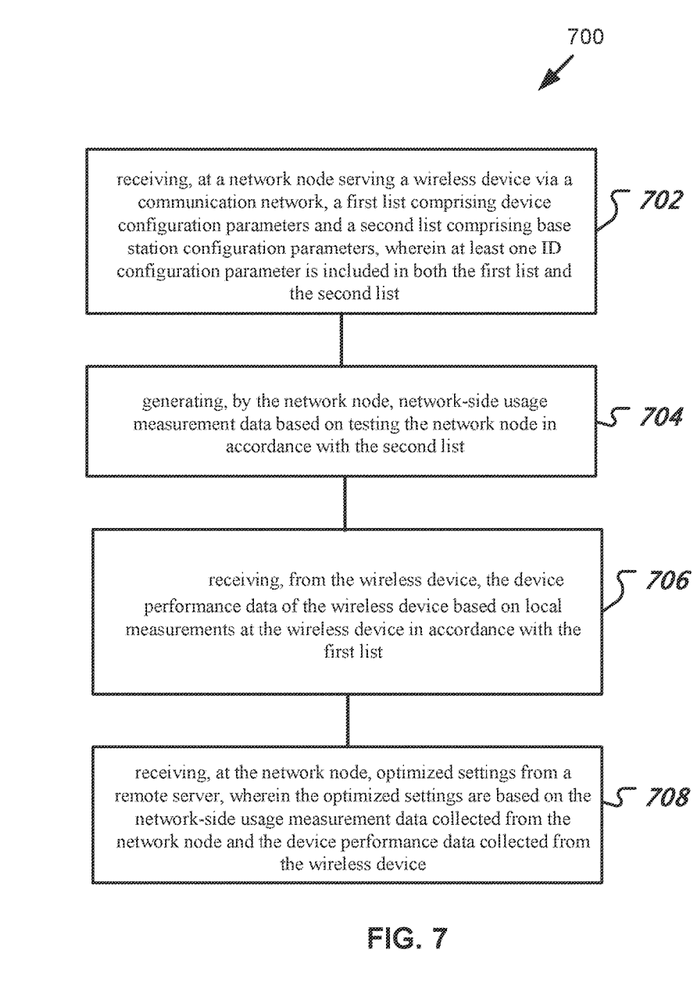
FIG. 7 illustrates a flowchart of an example method associated with a base station for receiving optimized settings based on MDT measurements and QoE measurements.

FIG. 7 illustrates a flowchart of an example method associated with a base station for receiving optimized set- tings based on MDT measurements and QoE measurements. Steps of this flowchart are from the perspective of the base station discussed in embodiments 1-3. At step 702, the process receives, at a network node serving a wireless device via a communication network, a first list comprising device configuration parameters and a second list comprising base station configuration parameters, wherein at least one ID configuration parameter is included in both the first list and the second list. At step 704, the process generates, by the network node, network-side usage measurement data based on testing the network node in accordance with the second list. At step 706, the process receives, from the wireless device, the device performance data of the wireless device based on local measurements at the wireless device in accordance with the first list. At step 708, the process receives, at the network node, optimized settings from a remote server, wherein the optimized settings are based on the network-side usage measurement data collected from the network node and the device performance data collected from the wireless device.

Figure 8:
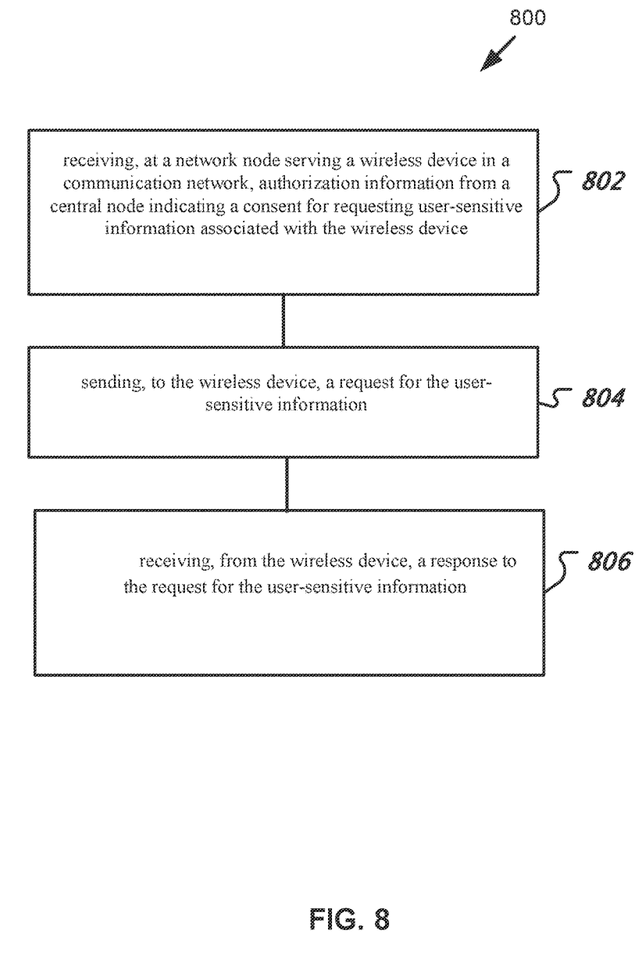
FIG. 8 illustrates a flowchart of an example method associated with a base station to receive authorization to obtain user-sensitive information.

FIG. 8 illustrates a flowchart of an example method associated with a base station to receive authorization to obtain user-sensitive information. Steps of this flowchart are from the perspective of the base station discussed in embodi- ment 4. At step 802, the process receives, at a network node serving a wireless device in a communication network, authorization information from a central node indicating a consent for requesting user-sensitive information associated with the wireless device. At step 804, the process sends, to the wireless device, a request for the user-sensitive infor- mation. At step 806, the process receives, from the wireless device, a response to the request for the user-sensitive information.

Some embodiments of the disclosed technology are pre- sented in clause-based format.

1. A method for wireless communications (e.g., method described in FIG. 7) comprising: receiving, at a network node serving a wireless device via a communication net- work, a first list comprising device configuration parameters and a second list comprising base station configuration parameters, wherein at least one ID configuration parameter is included in both the first list and the second list;
   generating, by the network node, network-side usage measurement data based on testing the network node in accordance with the second list;
   receiving, from the wireless device, the device perfor- mance data of the wireless device based on local measurements at the wireless device in accordance with the first list; and
   receiving, at the network node, optimized settings from a remote server, wherein the optimized settings are based on the network-side usage measurement data collected from the network node and the device performance data collected from the wireless device.

2. The method of clause 1, further comprising:
   sending the network-side usage measurement data to the computing server for generation of the optimized set- tings data, wherein the computing server is located at an IP address specified in both the first list comprising device configuration parameters and the second list comprising base station configuration parameters.

3. The method of clause 2, further comprising:
   sending, to the wireless device, the first list for generation of the device performance data of the wireless device in accordance with the first list; and
   sending, to the computing server, the device performance data of the wireless device.

4. The method of clause 1, further comprising:
   receiving, from the wireless device, device measurement data representative of performance of the wireless device;
   sending the device measurement data representative of performance of the wireless device to the computing server located at an IP address specified in both the first list comprising device configuration parameters and the second list comprising base station configuration parameters.

5. The method of clause 1, further comprising:
   receiving, from the wireless device, device measurement data representative of performance of the wireless device; and
   using the at least one ID configuration parameter common to both the wireless device measurement data and the base station measurement data to merge the device measurement data and the base station measurement data into a combined data, wherein the at least one ID configuration parameter is unique across the communication network; and sending the combined data to the computing server located at an IP address specified in both the first list comprising device configuration parameters and the second list comprising base station configuration parameters.

6. The method of clause 1, wherein the first list comprises Quality of Experience (QoE) configuration parameters and the second list comprises Minimized Drive Test (MDT) configuration parameters, and wherein at least a portion of the QoE configuration parameters in the first list and at least a portion of the MDT configuration parameters in the second list are inter-related.

7. The method of clause 6, wherein the QoE configuration parameters include one or more of: QoE Session ID/QMC ID/Trace ID, an IP address of the computing server, QoE measurement interval, QoE measurement period, a user consent for QoE measurement, and QoE measurement metrics.

8. The method of clause 7, wherein the QoE measurement metrics include a type of service associated with the wireless device, packet delay, packet loss, packet drop, throughput associated with the wireless device, Internet Protocol (IP) latency, network slice information, and clock synchronicity.

9. The method of clause 6, wherein the MDT configuration parameters include one or more of: MDT session ID/MDT Trace ID, delay, packet loss, throughput, network signal reception strength, UE ID, UE selection criteria, MDT measurement interval, MDT measurement period, a user consent for MDT measurements, and an IP address of the computing server.

10. The method of clause 1, wherein the at least one ID configuration parameter included in both the first list and the second list corresponds to: MDT session ID, MDT Trace ID, Quad Integrated Communications Controller Multichannel Controller (QMC) ID, QoE session ID, or QoE Trace ID.

11. The method of clause 1, wherein the device configuration parameters in the first list are based on a first sampling period and the base station configuration parameters in the second list are based on a second sampling period.

12. The method of clause 11, wherein the first sampling period is related to the second sampling period.

13. The method of clause 11, wherein the first sampling period is equal to the second sampling period.

14. The method of clause 12, wherein the first sampling period and the second sampling period are related by a multiplication factor.

15. The method of clause 1, wherein the device configuration parameters in the first list are associated with a first measurement interval and the base station configuration parameters in the second list are based on a second measurement interval.

16. The method of clause 15, wherein the first measurement interval is related to the second measurement interval.

17. The method of clause 16, wherein the first measurement interval is equal to the second measurement interval.

18. The method of clause 16, wherein the first measurement interval and the second measurement interval are related by a multiplication factor.

19. The method of clause 1, wherein the first list comprising device configuration parameters and the second list comprising base station configuration parameters are received from a network manager (NM) module or an operations and maintenance (O&M) module.

20. The method of clause 19, wherein the first list comprising device configuration parameters and the second list comprising base station configuration parameters are received via a core network over a 3GPP NG interface.

21. The method of clause 19, wherein the first list comprising device configuration parameters and the second list comprising base station configuration parameters are received directly from the NM without involvement of a core network.

22. The method of clause 1, wherein the network node is a first network node, further comprising:

in response to determining that the wireless device is to be handed off to a second network node, sending the first list comprising device configuration parameters to the second network node for transmission to the wireless device.

23. The method of clause 22, wherein the first list comprising device configuration parameters is included in a HANDOVER REQUEST message to the second network node via an inter-base station interface.

24. The method of clause 19, wherein the network node supports a split architecture comprising a gNB-DU node and a gNB-CU-UP node, wherein the first list and the second list are received at the gNB-DU node via F1AP and at the gNB-CU-UP node via E1AP.

25. The method of any one or more of clauses 1-24, wherein the first list additionally comprises the base station configuration parameters.

26. The method of clauses 1-25, wherein the second list additionally comprises the device configuration parameters.

B1. A method for wireless communications (e.g., method described in FIG. 8) comprising: receiving, at a network node serving a wireless device in a communication network, authorization information from a central node indicating a consent for requesting user-sensitive information associated with the wireless device;

sending, to the wireless device, a request for the user-sensitive information; and receiving, from the wireless device, a response to the request for the user-sensitive information.

B2. The method of clause B1, wherein the authorization information corresponds to one or more Public Land Mobile Networks (PLMNs).

B3. The method of clause B1, wherein the central node is a core network element.

B4. The method of clause B1, wherein the authorization information from the central node is included in an INITIAL CONTEXT SETUP REQUEST message.

B5. The method of clause B1, further comprising:

sending, by the network node to the central node, a response to the authorization information from the central node.

B6. The method of clause B5, wherein the response to the authorization information is included in an INITIAL CONTEXT SETUP RESPONSE message.

B7. The method of clause B1, wherein the response to the request for the user-sensitive information includes one or more reports associated with the wireless device.

B8. The method of clause B1, wherein the one or more reports associated with the wireless device includes at least one of: a radio link failure (RLF) report, a random access channel (RACH) report, a cloud edge fabric (CEF) report, or a QOE report of the wireless device.

B9. The method of clause B1, wherein the request for the user-sensitive information is included in a RRC UEInformationRequest message to the wireless device.

B10. The method of clause B9, wherein the response, from the wireless device, to the request for the user-sensitive information is included in a UEInformationResponse message of RRC.

B11. A method for wireless communications comprising:
receiving, at a server coupled to a network node serving a wireless device in a communication network, device performance data of the wireless device based on local measurements at the wireless device in accordance with a set of device configuration parameters;
receiving, network-side usage measurement data based on local measurements at the network node in accordance with a set of base station configuration parameters; and
generating, at the server, optimized settings based on the network-side usage measurement data and the device performance data, wherein at least one ID configuration parameter commonly included in the network-side usage measurement data and the device performance data is used in the generating the optimized settings.

B12. A method for wireless communications comprising:
receiving, at a wireless device, device configuration parameters from a network node serving the wireless device in a communication network;
conducting, at the wireless device, device performance tests in accordance with the device configuration parameters; and
sending, by the wireless device, results of the device performance tests to the network node for analysis in conjunction with network-side usage measurement data based on local measurements at the network node, wherein the analysis uses as an index an identifier commonly included in the network-side usage measurement data and the results of the device performance tests.

XX. The method of any one or more of clauses 1-B12, wherein a network node is a base station.

YY. An apparatus for wireless communication comprising a processor that is configured to carry out the method of any of clauses 1 to XX.

YZ. A non-transitory computer readable medium having code stored thereon, the code when executed by a processor, causing the processor to implement a method recited in any of clauses 1 to XX.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for wireless communications comprising:
   receiving, at a network node serving a wireless device via a communication network, one or more device configuration parameters and one or more base station configuration parameters;
   generating, by the network node, network-side usage measurement data based on testing the network node in accordance with the one or more base station configuration parameters;
   sending, by the network node to the wireless device, the device configuration parameters;
   receiving, from the wireless device, device performance data of the wireless device in accordance with the one or more device configuration parameters; and
   sending, by the network node to a computing server, the network-side usage measurement data and the device performance data of the wireless device;
   wherein at least one ID configuration parameter is included in both the one or more device configuration parameters and the one or more base station configuration parameters, and wherein the at least one ID configuration parameter includes a Minimized Drive Test (MDT) trace ID.

2. The method of claim 1, further comprising:
   receiving, from the wireless device, device measurement data representative of performance of the wireless device;
   sending the device measurement data representative of performance of the wireless device to the computing server located at an IP address specified in both the one or more device configuration parameters and the one or more base station configuration parameters.

3. The method of claim 1, further comprising:
   receiving, from the wireless device, device measurement data representative of performance of the wireless device;
   using the at least one ID configuration parameter to merge the device measurement data and the base station measurement data into a combined data, wherein the at least one ID configuration parameter is unique across the communication network; and
   sending the combined data to the computing server located at an IP address specified in both the one or more device configuration parameters and the one or more base station configuration parameters.

4. The method of claim 1, wherein the device configuration parameters comprise Quality of Experience (QoE) configuration parameters and the base station configuration parameters comprise Minimized Drive Test (MDT) configuration parameters, and wherein at least a portion of the QoE configuration parameters in the device configuration parameters and at least a portion of the MDT configuration parameters in the base station configuration parameters are inter-related.

5. The method of claim 4, wherein the QoE configuration parameters include one or more of: QoE Session ID/QMC ID/Trace ID, an IP address of the computing server, QoE measurement interval, QoE measurement period, a user consent for QoE measurement, and QoE measurement metrics.

6. The method of claim 5, wherein the QoE measurement metrics include a type of service associated with the wireless device, packet delay, packet loss, packet drop, throughput associated with the wireless device, Internet Protocol (IP) latency, network slice information, and clock synchronicity.

7. The method of claim 4, wherein the MDT configuration parameters include one or more of: MDT session ID/MDT Trace ID, delay, packet loss, throughput, network signal reception strength, UE ID, UE selection criteria, MDT measurement interval, MDT measurement period, a user consent for MDT measurements, and an IP address of the computing server.

8. The method of claim 1, wherein the at least one ID configuration parameter included in both the one or more device configuration parameters and the one or more base station configuration parameters corresponds to: MDT session ID, MDT Trace ID, Quad Integrated Communications Controller Multichannel Controller (QMC) ID, QoE session ID, or QoE Trace ID.

9. The method of claim 1, wherein the device configuration parameters are based on a first sampling period and the base station configuration parameters are based on a second sampling period.

10. The method of claim 9, wherein the first sampling period is equal to the second sampling period.

11. The method of claim 9, wherein the first sampling period and the second sampling period are related by a multiplication factor.

12. The method of claim 1, wherein the device configuration parameters and the base station configuration parameters are received from a network manager (NM) module or an operations and maintenance (O&M) module.

13. The method of claim 12, wherein the one or more device configuration parameters and the one or more base station configuration parameters are received via a core network over a 3GPP NG interface.

14. The method of claim 12, wherein the one or more device configuration parameters and the one or more base station configuration parameters are received directly from the NM without involvement of a core network.

15. The method of claim 1, wherein the network node is a first network node, further comprising:
   in response to determining that the wireless device is to be handed off to a second network node, sending the one or more device configuration parameters to the second network node for transmission to the wireless device.

16. The method of claim 15, wherein the one or more device configuration parameters is included in a HANDOVER REQUEST message to the second network node via an inter-base station interface.

17. An apparatus for wireless communication comprising a processor and a memory storing instructions, execution of which by the processor causes the apparatus to:
   receive one or more device configuration parameters and one or more base station configuration parameters;
   generate network-side usage measurement data based on testing a network node serving a wireless device via a communication network in accordance with the one or more base station configuration parameters;
   send, to the wireless device, the device configuration parameters;

receive, from the wireless device, device performance data of the wireless device in accordance with the one or more device configuration parameters; and send, to a computing server, the network-side usage measurement data and the device performance data of the wireless device;

wherein at least one ID configuration parameter is included in both the one or more device configuration parameters and the one or more base station configuration parameters, and wherein the at least one ID configuration parameter includes a Minimized Drive Test (MDT) trace ID.

18. A non-transitory computer readable medium having code stored thereon, the code when executed by a processor, causing the processor to:

receive one or more device configuration parameters and one or more base station configuration parameters;

generate network-side usage measurement data based on testing a network node serving a wireless device via a communication network in accordance with the one or more base station configuration parameters;

send, to the wireless device, the device configuration parameters;

receive, from the wireless device, device performance data of the wireless device in accordance with the one or more device configuration parameters; and send, to a computing server, the network-side usage measurement data and the device performance data of the wireless device;

wherein at least one ID configuration parameter is included in both the one or more device configuration parameters and the one or more base station configuration parameters, and wherein the at least one ID configuration parameter includes a Minimized Drive Test (MDT) trace ID.

19. The apparatus of claim 17, wherein the device configuration parameters comprise Quality of Experience (QoE) configuration parameters and the base station configuration parameters comprise Minimized Drive Test (MDT) configuration parameters, and wherein at least a portion of the QoE configuration parameters in the device configuration parameters and at least a portion of the MDT configuration parameters in the base station configuration parameters are inter-related.

20. The non-transitory computer readable medium of claim 18, wherein the device configuration parameters comprise Quality of Experience (QoE) configuration parameters and the base station configuration parameters comprise Minimized Drive Test (MDT) configuration parameters, and wherein at least a portion of the QoE configuration parameters in the device configuration parameters and at least a portion of the MDT configuration parameters in the base station configuration parameters are inter-related.

* * * * *